US009056287B2

(12) United States Patent
Peltola et al.

(10) Patent No.: US 9,056,287 B2
(45) Date of Patent: Jun. 16, 2015

(54) FLOTATION MACHINE

(75) Inventors: Aleksi Peltola, Espoo (FI); Antti Rinne, Espoo (FI)

(73) Assignee: Outotec Oyj, Espoo (FI)

( * ) Notice: Subject to any disclaimer, the term of this patent is extended or adjusted under 35 U.S.C. 154(b) by 382 days.

(21) Appl. No.: 13/577,224

(22) PCT Filed: Feb. 22, 2011

(86) PCT No.: PCT/FI2011/050161
§ 371 (c)(1),
(2), (4) Date: Aug. 3, 2012

(87) PCT Pub. No.: WO2011/104437
PCT Pub. Date: Sep. 1, 2011

(65) Prior Publication Data
US 2012/0325730 A1    Dec. 27, 2012

(30) Foreign Application Priority Data
Feb. 23, 2010  (FI) ........................................ 20105170

(51) Int. Cl.
*B03D 1/16* (2006.01)
*B01F 3/04* (2006.01)
(Continued)

(52) U.S. Cl.
CPC .............. *B01F 3/04539* (2013.01); *B03D 1/16* (2013.01); *B01F 3/04617* (2013.01); *B01F 13/0827* (2013.01); *B01F 13/0836* (2013.01); *B01F 2003/04546* (2013.01); *B01F 2003/04652* (2013.01); *B01F 2003/04687* (2013.01); *C02F 1/24* (2013.01); *C02F 2201/002* (2013.01); *B03D 1/1412* (2013.01); *B03D 1/20* (2013.01)

(58) Field of Classification Search
USPC ......................................................... 209/169
See application file for complete search history.

(56) References Cited

U.S. PATENT DOCUMENTS

| 2,609,097 | A | * | 9/1952 | Dering .......................... 209/169 |
| 5,039,400 | A |   | 8/1991 | Kallioinen et al. |
| 5,284,249 | A | * | 2/1994 | Lawrence et al. ............. 209/169 |
| 2003/0121241 | A1 | | 7/2003 | Belke |
| 2009/0303832 | A1 | | 12/2009 | Hirvensalo |

FOREIGN PATENT DOCUMENTS

| CN | 1508960 A | 6/2004 |
| EP | 0433694 | 6/1991 |
| WO | 2008/025871 A1 | 3/2008 |

OTHER PUBLICATIONS

European Search Report for European Application No. 11746919.7, report issued Jun. 16, 2014, 4 pgs.
(Continued)

*Primary Examiner* — Thomas M Lithgow
(74) *Attorney, Agent, or Firm* — Chernoff, Vilhauer, McClung & Stenzel LLP

(57) ABSTRACT

An air distribution and mixing device is arranged in the vicinity of the bottom of a flotation cell for distributing air to the slurry for forming froth and mixing the slurry in the flotation cell. A rotor part of the air distribution and mixing device has air distribution apertures and is attached to the lower end of a drive shaft extending vertically in the flotation cell. The drive shaft has a hollow interior, which constitutes a flow channel for conducting flotation air to the air distribution holes of the rotor part. An electric motor for rotating the drive shaft is supported by a separate supporting framework, which is on top of the flotation cell. The electric motor is a permanent magnet motor having a vertical rotor shaft, the lower end of which is in permanent contact directly with the upper end of the drive shaft.

11 Claims, 2 Drawing Sheets

Figure 1:
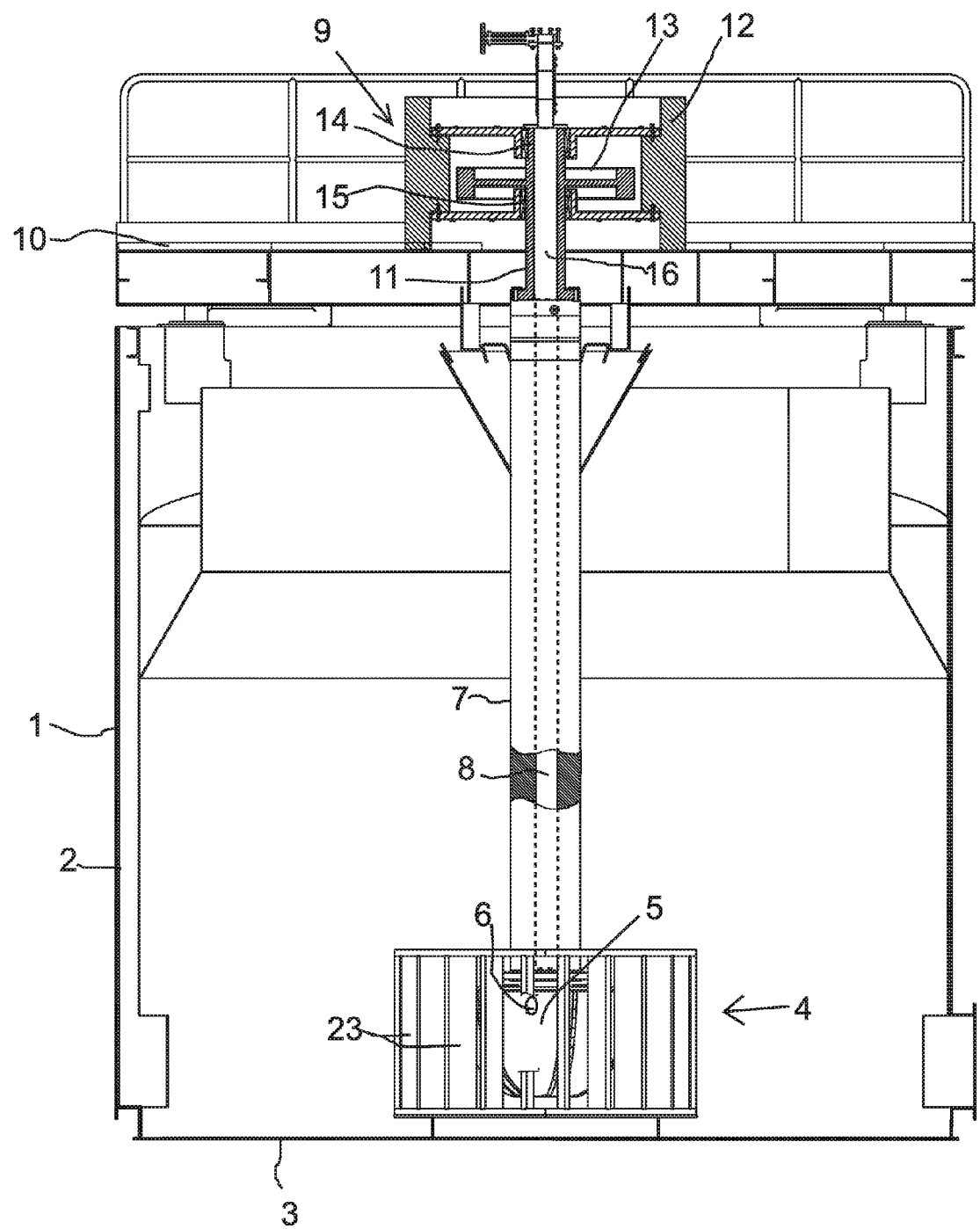

(51) Int. Cl.
*B01F 13/08* (2006.01)
*C02F 1/24* (2006.01)
*B03D 1/14* (2006.01)
*B03D 1/20* (2006.01)

(56) References Cited

OTHER PUBLICATIONS

Wallace, R.R. et al. Design of a 75 kW-167 rpm Axial Flux Permanent Magnet Synchronous Motor for Copper Mining Applications. International Symposium on Power Electronics, Electrical Drives, Automation and Motion 2006.
Chinese Office Action for Application No. 201180010615.7, issued May 23, 2013, 7 pages.
Chinese Search Report for Application No. 201180010615.7, issued May 23, 2013, 2 pages.
National Patent Office of Uzbekistan, Office Action (Inquiry) issued Jan. 5, 2015 in application No. IAP 20120357 (English translation).
Yuri Borisov et al., Electrical Technology, Moscow, Ensrgoatomizdat. 1985, pp. 493-495.
English translation of Borisov reference.

* cited by examiner

FLOTATION MACHINE

This is a national stage application filed under 35 USC 371 based on International Application No. PCT/FI2011/050161 filed Feb. 22, 2011, and claims priority under 35 USC 119 of Finnish Patent Application No. 20105170 filed Feb. 23, 2010.

FIELD OF THE INVENTION

The invention relates to the flotation machine defined in the preamble of claim 1.

BACKGROUND OF THE INVENTION

Flotation machines are known from before, e.g., from patent specifications FI 78628 B, FI 115612 B, WO 93/14876 for floating hydrophobic particles from aqueous slurry that contains these particles. Typically, the flotation machine includes a flotation cell, which comprises a vertical side wall and a bottom and, possibly, a cover. The flotation machine comprises one or more air distribution and mixing devices, which are arranged in the middle part of the cell for distributing air to the slurry to form froth an to mix the slurry in the flotation cell. The middle part of the cell refers to the location essentially at the vertical centre line of the cell. In the case of several air distribution and mixing devices, they are located symmetrically around the centre line in its vicinity. The air distribution and mixing device includes a rotor part that comprises air distribution apertures. A drive shaft is arranged to extend vertically in the flotation cell. The rotor part is attached to the lower end of the drive shaft. The drive shaft comprises a hollow interior, which constitutes a flow channel for conducting flotation air to the air distribution holes of the rotor part.

In prior art, the operation of the drive shaft is arranged by means of a high-speed electric motor, such as a conventional cage induction motor, which drives the drive shaft through a gear box or a V-belt drive. To fit the drive shaft with a bearing, a separate support bearing unit is arranged in connection with the V-belt drive, being supported by the overhead support structure of the flotation cell. Air supply into the hollow drive shaft is arranged through the support bearing unit in the manner described, e.g., in the specification FI 115612.

A problem with the prior art is that the belt drive or gear box reduces the efficiency of the power transmission. A further problem is the large space utilization in terms of height required by the transmission structure. The belt transmission system, which comprises large-size belt pulleys, requires a large-size encapsulation around the same. The V-belt drive also induces high internal stresses in the support structures. There is a further problem that the present combination of the electric motor and V-belt drive or the gear box and bearing unit has a complex structure and it contains many parts that are susceptible to wearing and failure, reducing the reliability and causing a repeated need of maintenance. The abrasive dust emitted from the flotation process causes wearing of the V belt and the V-belt drive pulleys. Furthermore, the operation and transmission equipment is heavy and it requires a sturdy supporting structure, which incurs costs. The air supply into the hollow drive shaft is difficult to arrange.

OBJECT OF THE INVENTION

The object of the invention is to eliminate the disadvantages mentioned above.

In particular, the object of the invention is to provide a simple, reliable, small-size and light-weight drive apparatus, which contains only a few failing parts and does not require much maintenance, for driving the drive shaft of the flotation machine.

A further object of the invention is to provide a flotation machine, which needs no separate bearing unit, but wherein the bearing of the electric motor works as the bearing of the drive shaft at the same time.

A further object of the invention is to provide a flotation machine, wherein the air supply into the inner air channel of the drive shaft is easy and simple to arrange.

SUMMARY OF THE INVENTION

The flotation machine according to the invention is characterized in that, which is disclosed in claim 1.

According to the invention, the electric motor is a permanent magnet motor that comprises a vertical rotor axis, the lower end of which is in a fixed connection directly with the upper end of the drive shaft.

An advantage of the invention is that, as no gear system is needed, the direct drive of the drive shaft by the permanent magnet motor improves the efficiency of the power transmission, whereby losses due to transmission are omitted. By the permanent magnet motor, it is possible to provide a smooth start-up with a high torque and the adjustment of its rotational velocity is simple to arrange. The permanent magnet motor can be rendered flat, small-size and light-weight, whereby its space requirement is small and the supporting structures can be dimensioned to be lighter than before. The abrasive dust emitted from the flotation process does not damage the permanent magnet motor. A further advantage is that the bearing of the rotor axis of the permanent magnet motor and the bearing of the drive shaft can be integrated; in other words, the same bearings can support both the rotor axis of the permanent magnet and the drive shaft and receive the loads coming from the mixing. Air supply is easy to arrange using the hollow rotor axis.

The said fixed connection between the rotor axis and the drive shaft can be implemented, firstly, so that the lower end of the rotor axis is attached directly to the upper end of the drive shaft. In an embodiment of the flotation machine, the upper end of the drive shaft comprises a first attachment flange and the lower end of the rotor axis of the electric motor comprises a second attachment flange, which is adapted to be attached to the first attachment flange by a bolted joint.

On the other hand, the fixed connection can be implemented so that the rotor axis and the drive shaft form one continuous part, which is made of metal by casting, for example.

In an embodiment of the flotation machine, the permanent magnet motor is supported by a separate supporting framework, which is on top of the flotation cell.

In an embodiment of the flotation machine, the permanent magnet motor includes a stator, which is attached to the said framework above the flotation cell, and a rotor, the periphery of which comprises a number of permanent magnets, the rotor being fixedly connected to the said vertical rotor axis. The rotor axis is fitted with a bearing to rotate with respect to the stator, preferably by an upper bearing located above the rotor and preferably by a lower bearing located below the rotor, which bearings at the same time constitute the bearing of the drive shaft, which receives the loads caused by air distribution and mixing. Fitting the drive shaft with the bearing of the permanent magnet motor eliminates the need of a separate bearing unit. The upper and the lower bearing can also be located on the same side of the rotor, i.e., each one of them can either be located above or below the rotor and also outside the actual stator, i.e., when viewed in the direction of the rotor axis, above or below the stator.

In an embodiment of the flotation machine, the rotor axis comprises a second hollow interior, which together with the hollow interior of the drive shaft forms a flow channel for conducting flotation air to the rotor part. Air is simply fed from the end of the rotor axis of the electric motor into its hollow interior, through which it flows to the hollow interior of the drive shaft and further out of the air distribution holes of the rotor part of the mixer and into the slurry.

In an embodiment of the flotation machine, the stator preferably includes a monolithic metal block, which is formed from one material and which comprises a central vertical through hole. As an alternative to the seamless solid metal block, the stator can also be composed of constituent parts. It is then essential to ensure a functional entity for the stator flux. The inner wall of the block that edges the opening has an upwards-directed upper seat and a downwards-directed lower seat formed therein, the latter being vertically at a distance from the upper stop face. In this embodiment, the stator further includes an upper flange, in which the upper bearing is centrally arranged, the upper flange being attached to the upper seat. In this embodiment, the stator further includes a lower flange, in which the lower bearing is centrally arranged, the lower flange being attached to the lower seat.

In an embodiment of the flotation machine, the flotation cell is upwards open.

In an embodiment of the flotation machine, the flotation cell is upwards closed. This means that, in addition to the vertical side wall and the bottom, which closes the flotation cell downwards or at the bottom, the flotation cell also includes a cover part or the like that closes the flotation cell upwards or at its upper end.

In an embodiment of the flotation machine, the air distribution and mixing device includes a stationary stator part, which is supported by the bottom of the flotation cell. The stator part comprises a number of baffles, which are arranged around the rotor part.

LIST OF FIGURES

Figure 2:
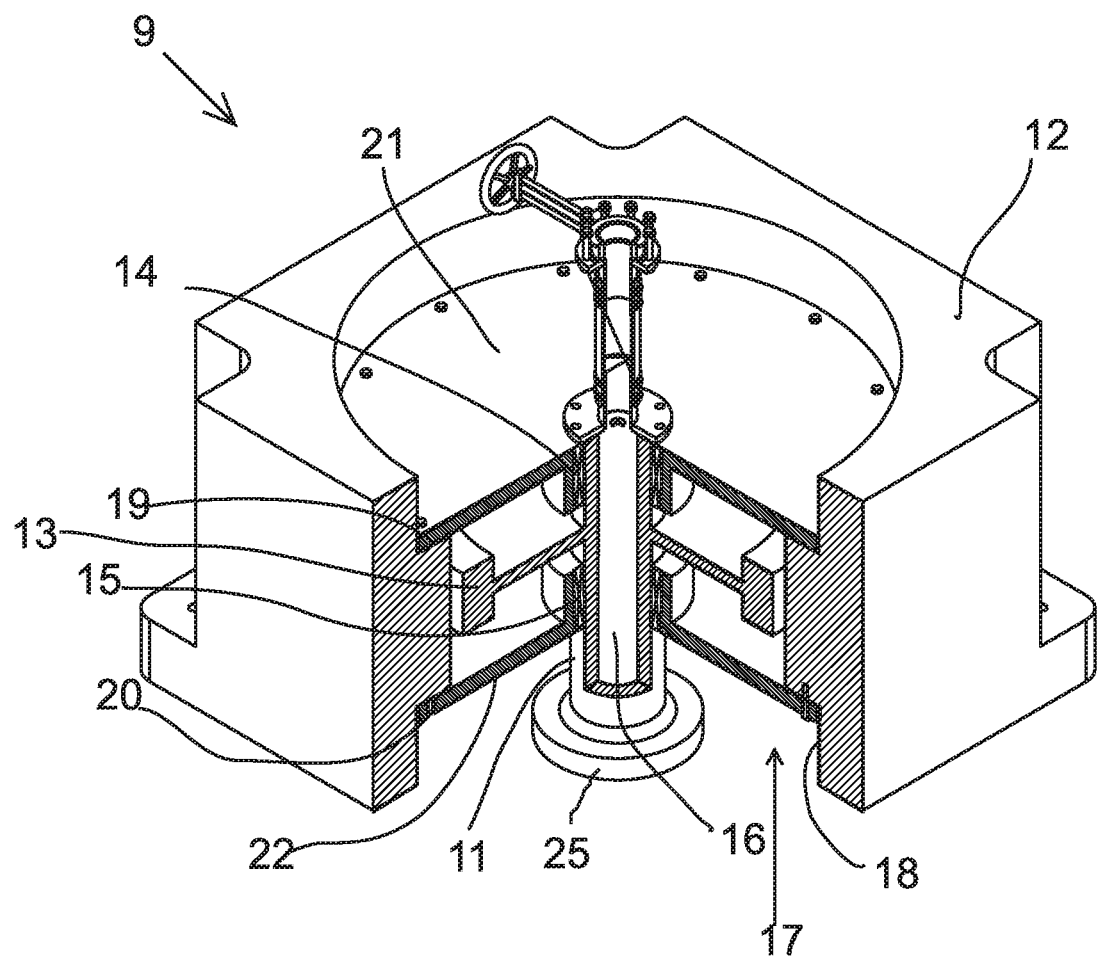

In the following, the invention is described in detail by means of exemplary embodiments and with reference to the appended drawing, wherein FIG. 1 shows a schematic cross section of an embodiment of the flotation machine according to the invention; and FIG. 2 is an axonometric view, partially in cross section, of the permanent magnet motor of the flotation machine of FIG. 1.

DETAILED DESCRIPTION OF THE INVENTION

FIG. 1 shows a flotation machine for floating hydrophobic particles from aqueous slurry that contains these particles. In this example, the flotation machine includes an upwards-open (an upwards-closed model is also possible) flotation cell 1, which comprises a vertical side wall 2 and a bottom 3. The upwards-closed cell would also include a cover, which is not shown in the figure. An air distribution and mixing device 4 is arranged at the vertical centre line of the cell. Its purpose is to mix the slurry and, at the same time, distribute air into the slurry, so that air bubbles are formed, which rise and form froth in the upper part of the cell to exit as an overflow. The air distribution and mixing device includes a rotor part 5 that comprises air distribution apertures 6. Additionally, the air distribution and mixing device 4 includes a stationary stator part 23, which in this example is supported by the bottom 3 of the flotation cell. The support can also be arranged in another way, e.g., by supporting the stator part by the upper part of the flotation cell. The stator part 23 comprises a number of baffles that are arranged around the rotor part 5. The rotor part 5 is attached to a vertical drive shaft 7 that is rotated around the vertical axis. The drive shaft 7 comprises a hollow interior 8, which constitutes a flow channel for conducting flotation air to the air distribution apertures 6 of the rotor part and through them to the slurry.

A permanent magnet motor 9 is arranged to rotate the drive shaft 7, being also shown in FIG. 2. The permanent magnet motor 9 is supported by a separate supporting framework 10, which is on top of the flotation cell 1. The permanent magnet motor 9 comprises a vertical hollow rotor axis 11, the lower end of which is attached directly to the upper end of the drive shaft 7. For the attachment, the upper end of the drive shaft 7 in this example comprises a first attachment flange 25. Correspondingly, the lower end of the rotor axis 11 in this example comprises a second attachment flange 26, which is adapted to be attached to the first attachment flange. Alternatively, the drive shaft 7 and the rotor axis 11 can constitute one continuous axis part. Together with the hollow interior 8 of the drive shaft 7, the hollow interior 16 of the rotor axis 11 forms a flow channel for conducting flotation air to the rotor part 5.

In the example of FIG. 1, the flotation cell includes only one entity that comprises the electric motor, the drive shaft and the air distribution and mixing device. Naturally, it is possible that several such entities are combined in one flotation cell.

Referring to FIG. 2, the permanent magnet motor 9 includes a stator 12, which is attached to the framework 10 above the flotation cell. On the periphery of the rotor 13 of the permanent magnet motor 9, there are a number of permanent magnets (not shown). The rotor 13 is fixedly connected to the rotor axis 11. The rotor axis 11 is fitted with a bearing to rotate with respect to the stator 12, in this example, by an upper bearing 14 located above the rotor and, in this example, by a lower bearing 15 located below the rotor, which bearings at the same time constitute the bearing of the drive shaft 7, which receives the loads caused by air distribution and mixing. The drive shaft has no other bearing. As an alternative to the example of the figure, it is also possible for both bearings to be located on either side of the rotor.

In this example, the stator 12 includes a monolithic metal block, which is formed from one material and which comprises a central vertical through hole 17. On the inner wall 18 of the block that edges the opening 17, there is formed an upwards-directed, in this example, annular upper seat 19 and a downwards-directed, in this example, annular lower seat 20, which is vertically at a distance from the upper seat 19. The stator 12 further includes an upper flange 21, in which the upper bearing 14 is centrally arranged, the upper flange being attached to the upper seat 19 by a bolted joint. The stator further includes a lower flange 22, in which the lower bearing 15 is centrally arranged, the lower flange being attached to the lower seat 20.

The invention is not limited only to the exemplary embodiment described above, but many modifications are possible within the inventive idea defined by the claims.

The invention claimed is:

1. A flotation machine for floating hydrophobic particles from aqueous slurry that contains these particles, comprising
a flotation cell that comprises a vertical side wall and a bottom;
an air distribution and mixing device, which is arranged in the middle part of the cell to distribute air into the slurry for forming froth and mixing the slurry in the flotation cell, the air distribution and mixing device including a rotor part that comprises air distribution apertures;

a drive shaft, which is arranged so as to extend vertically in the flotation cell, the rotor part being attached to the lower end of the drive shaft, the drive shaft comprising a hollow interior, which constitutes a flow channel for conducting flotation air to the air distribution apertures of the rotor part; and an electric motor for rotating the drive shaft;

wherein the electric motor is a permanent magnet motor that comprises a vertical hollow rotor axis, the lower end of which is in a fixed connection directly with the upper end of the drive shaft, and wherein the permanent magnet motor includes a stator which is attached to a framework above the flotation cell, and a rotor, on the periphery of which there are a number of permanent magnets, the rotor being fixedly connected to the vertical rotor axis, the rotor axis fitted with a bearing that rotates with respect to the stator using an upper bearing and a lower bearing together forming the bearing of the drive shaft, which receives loads caused by the air distribution and mixing device.

2. A flotation machine according to claim 1, wherein the upper end of the drive shaft comprises a first attachment flange and the lower end of the rotor axis comprises a second attachment flange, which is adapted to be attached to the first attachment flange.

3. A flotation machine according to claim 1, wherein the rotor axis and the drive shaft form one continuous part.

4. A flotation machine according to claim 1, wherein the permanent magnet motor is supported by said framework which is a separate supporting framework, which is on top of the flotation cell.

5. A flotation machine according to claim 1, wherein the rotor axis comprises a second hollow interior, which together with the hollow interior of the drive shaft forms a flow channel for conducting flotation air to the rotor part.

6. A flotation machine according claim 1, wherein the stator includes a metal block, which is formed from one material and which comprises a central vertical through-hole edged by an inner wall, the inner wall having formed thereon an upwards-directed upper seat and a downwards-directed lower seat, which in the vertical direction is at a distance from the upper seat;

an upper flange, in which the upper bearing is centrally arranged, the upper flange being attached to the upper seat; and a lower flange, in which the lower bearing is centrally arranged, the lower flange being attached to the lower seat.

7. A flotation machine according to claim 6, wherein the metal block is monolithic.

8. A flotation machine according to claim 1, wherein the flotation cell is upwards open.

9. A flotation machine according to claim 1, wherein the flotation cell is upwards closed.

10. A flotation machine according to claim 1, wherein the air distribution and mixing device includes a stationary stator part.

11. A flotation machine according to claim 10, wherein the stationary stator part is supported by the bottom of the flotation cell and includes a number of baffles arranged around the rotor part.

* * * * *